April 8, 1941.  F. W. CALDWELL  2,237,924
PROPELLER FOR AIRCRAFT
Original Filed April 21, 1931
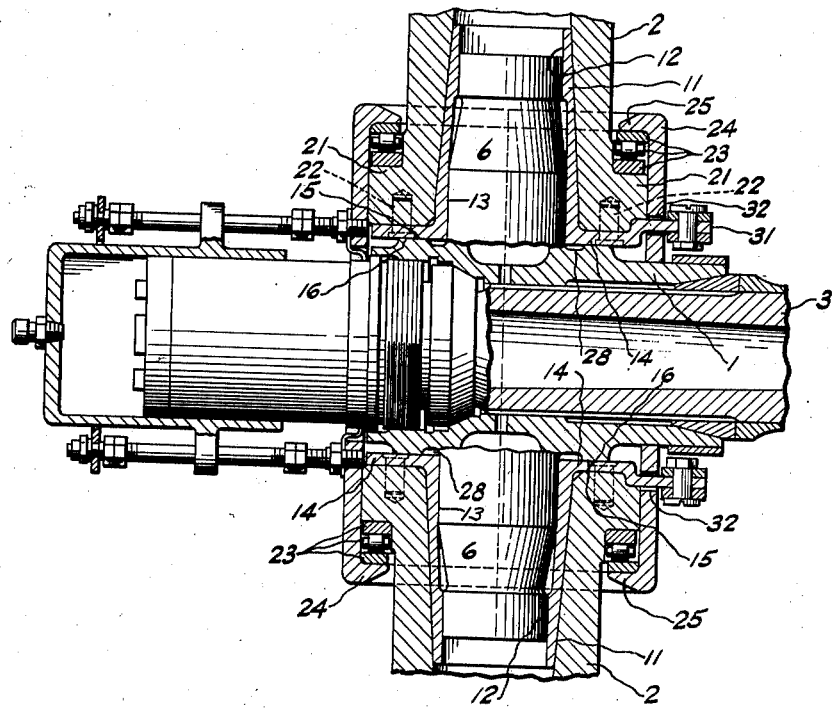
INVENTOR.
*Frank W. Caldwell.*
BY *Harris G. Luther*
ATTORNEY Patented Apr. 8, 1941

2,237,924

UNITED STATES PATENT OFFICE 2,237,924

PROPELLER FOR AIRCRAFT

Frank W. Caldwell, Hartford, Conn., assignor to United Aircraft Corporation, East Hartford, Conn., a corporation of Delaware Original application April 21, 1931, Serial No. 531,685. Divided and this application July 24, 1937, Serial No. 155,370

3 Claims. (Cl. 170—162)

This invention relates generally to propellers for aircraft and more particularly to controllable pitch propellers for aircraft.

An object of the invention is to provide a propeller for aircraft having blades, the pitch of which may be controlled during flight of the aircraft.

A further object is to provide improved methods of making and assembling controllable pitch propeller mechanisms.

This application is a division of application Ser. No. 531,685 filed April 21, 1931, which has now matured into Patent No. 2,032,254 and is also a division of application Ser. No. 65,144 filed February 21, 1936, which has now matured into Patent No. 2,138,370.

In the accompanying drawing, the figure is a longitudinal section of the propeller taken on a plane at right angles to the plane of rotation thereof with portions of the mechanism shown in full.

Referring to the drawing, a controllable pitch propeller embodying my invention comprises, in general, a hub structure 1 upon which is mounted a plurality of propeller blades 2, extending from the hub 1 in the plane of rotation and with their axes in alignment. The hub 1 is carried, in the usual manner, on the end of a hollow engine shaft 3. The end of the shaft 3 is tapered to fit a complementary tapered bore in the hub 1, and the exterior of the shaft is splined to mate with a similarly splined interior surface of the hub.

The hub is a one-piece structure comprising in general a substantially cylindrical body portion from which extend integrally formed arms 6 to constitute a spider having studs on which the blades 2 are mounted. The particular blades 2 shown in the drawing are similar to conventional metallic blades insofar as their general shape and aerodynamic qualities are concerned.

The roots or shanks of the blades are hollow, and each blade root is bored and fitted with an internal sleeve 11 having internal bearing surfaces 12 and 13 that engage complementary journals on the arms 6. The bearing surfaces on the arms function to transmit driving torque to the blades and permit them to be turned about their longitudinal axes for adjusting the pitch. The sleeve 11 is provided with an integral laterally extending flange 14 that abuts against the end of the blade 2 and is provided with a laterally disposed bearing surface 15 that engages a complementary annular plane bearing surface 16 on the body portion of the hub 1 encircling each stud 6 to cooperate with the stud in rigidly holding the blade 2.

The end of the blade adjacent the flange 14 is provided with an integral outwardly turned flange 21 to which the flange 14 is secured by dowels or screws 22. For holding the blades 2 on the studs 6 with the flanges 14 tightly against the bearing surfaces 16, each blade is provided with an anti-friction thrust bearing 23 disposed to encircle the blade shank and to bear against the outwardly turned flange 21. The bearings 23 on the two blades are inter-connected by a thrust resisting structure or barrel 24, having, at its ends, inwardly turned flanges 25 that engage the outer races of the thrust bearings.

As shown, the barrel 24 is split along its longitudinal axis in such manner that it may be fitted over the blade roots and the semi-cylindrical halves secured together by suitable bolts (not shown). Openings are provided in substantially the middle of each barrel half to permit it to fit over the cylindrical body portion of the hub 1. The barrel 24 is made to fit the bearings 23 closely so that the blades 2 are held rigidly in position but may be turned about their longitudinal axes upon application of relatively large twisting force.

As a method of manufacture, in the event that the blades are of the hollow steel type or of a type in which the flange 21 is formed first and the blade shaped afterwards, the bearing 23 may be applied to the heated blade after the flange 21 has been formed, but just before the blade has been pressed to its final shape.

After the bearing 23 has been applied to the blade shank, the sleeve 11, which is preferably of steel, may be inserted. As shown, the exterior of the sleeve 11 is tapered to fit a complementary tapered surface on the interior of the blade shank. Sleeve 11 is made to fit accurately within the blade shank and is placed in position by first moderately heating the blade, as for instance by dipping the shank in hot oil, after which the sleeve 11 is pressed into the hollow root of the blade to bring its flange 14 into contact with the flange 21 of its blade root. The bearing surfaces may be lubricated by graphite or similar material which may be placed in an annular chamber 29 adjacent to the annular bearing surfaces 16. The action of centrifugal force will force the lubricant outwardly to lubricate the bearing surfaces 12 and 13.

As shown, the outer end of the sleeve 11 is reduced to what is known as a feather edge to permit it to flex with the blade during flight and thus avoid concentration of stress in the blade at the end of the sleeve. It is highly important in propeller construction to avoid all localization of stress. Fatigue cracks usually start from that condition.

By fitting the blades 2 in this manner very accurately and tightly on the studs 6 of the hub 1, wear between the blades and the hub is reduced to a minimum. During flight there is constant vibration in the propeller structure, particularly in the blades, and if looseness occurs between the blades and the hub, relative motion will result in destructive abrasion.

Although the blades 2 are fitted closely to the hub 1, it is possible by means of suitable apparatus, such as is completely described in the original parent application, Serial No. 531,685, filed April 21, 1931, to turn the blades 2 for adjusting the pitch angle thereof, by means of an operating lug 31 formed integral with the flange 14 of the sleeve 11 and extending through a slot 32 in the barrel 24. The slot 32 is made of such length that the blade may be turned through a predetermined maximum angle of adjustment, but is prevented from turning to a position beyond the predetermined range. In a particular practical embodiment of my invention, a torque of substantially 2000 lb. inches is required to move the two blades 2 relative to the spider.

The particular structure shown and the descriptions thereof are for the purpose only of disclosing complete and workable apparatus and it will be obvious to others skilled in the art that various modifications in the details may be made without departing from the scope of the invention defined in the appended claims.

I claim:

1. A controllable pitch propeller comprising a hub having pivot arms and annular plane bearing surfaces, blades having shanks journalled on the pivot arms, the blades having sleeves in their shanks provided with bearing surfaces for engaging the arms, and said sleeves having shoulders extending radially at the inner ends of the blades and engaging the annular bearing surfaces on the hub, blade retaining means for holding said blades against a tendency to move radially outward due to the centrifugal force developed in the blades, said pivot arms and said sleeve constructed and arranged so that substantially none of the centrifugal force developed by the blade can be transmitted through the sleeve to the pivot arms.

2. A controllable pitch propeller comprising a hub having radially projecting pivot arms, each arm having two external cylindrical bearing surfaces and being encircled by an annular bearing surface on the hub disposed in a plane transverse to the arm, propeller blades having sleeves with flanges journalled on the arms, said sleeves engaging the bearing surfaces on the arms and the flanges thereof adapted to engage the said annular bearing surfaces, blade retaining means acting against exterior surfaces of the blade for holding said blade against a tendency to move radially outward due to the centrifugal force developed in the blades, said pivot arms and said sleeves constructed and arranged so as to render said blade and sleeve removable as a unit from said hub.

3. A controllable pitch propeller comprising a hub having pivot arms and annular bearing surfaces encircling said arms, blades having sleeves in their shanks provided with bearing surfaces for engaging the arms to journal the blades thereon and having shoulders extending radially at the inner ends of the blades and engaging the annular bearing surfaces on the hub and means acting on the blades, exterior of the blade surface, to resist a tendency of the blades to move radially outwards due to the effects of centrifugal force on the blades and to bias said blade ends toward said shoulders to hold said shoulders against said annular bearing surfaces.

FRANK W. CALDWELL.